United States Patent [19]

Monigold et al.

[11] 4,189,095
[45] Feb. 19, 1980

[54] COMBINATION VALVE

[75] Inventors: Larry E. Monigold; Ronald G. Cadwell, both of Cadillac, Mich.

[73] Assignee: Kysor Industrial Corporation, Cadillac, Mich.

[21] Appl. No.: 957,147

[22] Filed: Nov. 2, 1978

[51] Int. Cl.² ............................................. G05D 27/00
[52] U.S. Cl. ................................... 236/92 R; 137/529; 192/82 T; 236/100
[58] Field of Search ............... 236/92 R, 92 C, 99 K, 236/100, 35, 73; 192/82 T; 137/529

[56] References Cited

U.S. PATENT DOCUMENTS

| | | | |
|---|---|---|---|
| 2,837,285 | 6/1958 | Urban | 236/92 R X |
| 3,118,648 | 1/1964 | Campbell | 236/35 X |
| 3,174,410 | 3/1965 | Booth et al. | 236/92 R X |
| 3,353,745 | 11/1967 | Beatenbough | 236/92 R X |
| 3,554,440 | 1/1971 | Austin et al. | 236/92 R X |
| 3,927,830 | 12/1975 | Briski | 192/82 T X |

Primary Examiner—William E. Wayner
Assistant Examiner—William E. Tapolcai
Attorney, Agent, or Firm—Price, Heneveld, Huizenga & Cooper

[57] ABSTRACT

A temperature and pressure responsive fluid flow control valve, particularly useful for controlling the operation of a fluid fan drive. This valve regulates operation of the fluid fan drive by controlling the fluid flow from the fluid fan drive, in response to both engine coolant temperature and fluid pressure of the fan drive oil.

2 Claims, 2 Drawing Figures

COMBINATION VALVE

BACKGROUND OF THE INVENTION

This invention relates to a fluid flow control valve responsive to both temperature and pressure conditions, and particularly a fluid flow control valve for regulating engine cooling fan operation.

One type of known engine cooling fan drive is fluid operated, e.g. an oil torus fan drive, wherein fan speed is controllably decreased or increased by the amount of fluid allowed to flow out of the drive or retained in the drive, to vary the amount of cooling air propelled through the radiator containing circulating engine coolant liquid. It has been known to provide a temperature responsive control valve that decreases this fluid release as the temperature rises, thereby causing fan speed increase for increased cooling air flow through the radiator. As temperature falls, conversely, fluid release or escape is increased to cause fan speed to decrease. One difficulty experienced with this type of control occurs when maximum cooling is required. Under such condition oil flow from the fan drive housing is prevented for maximum fan speed. But, since the engine speed is very high, very high pressures are created on the oil in the fan drive housing. Under this combination of conditions, the high oil pressure in the housing can damage the fan drive components. A pressure relief valve has been provided in the past to release this pressure, but the resulting system with multiple oil lines is very complex and cumbersome.

SUMMARY OF THE INVENTION

The fluid flow control valve of this invention comprises a compact unit responsive to both engine coolant temperature and pump fluid pressure to control pump fluid release. It enables a multiple of functions to be performed, being responsive to various temperature and pressure conditions to (1) cause the cooling fan to operate at less than full speed when the engine is cold, (2) cause cooling action of the fan to continue even at very low engine pressures, i.e. below about 6 psi, as for cooling an air conditioner radiator, (3) cause greater fan speed with increased engine temperature and (4) allow controlled pressure relief from the fan drive housing at high oil pressures, even at high engine temperatures, while still causing maximum cooling fan action.

These results are achieved without a complex miltiple of oil lines and other complexities.

The valve responds to increasing fluid pressure at greater engine speeds to open and allow fan idling by release of fluid from the fan drive. It responds to increasing engine coolant temperature to close and cause higher fan drive speeds. And, significantly, it responds to both fluid pressure and coolant temperature to optimize fan drive conditions for cooling without excessive fluid pressure resulting.

The valve has a valve spool biased against a valve seat to close the valve thus allowing no fluid by-pass, the spool shifting off the valve seat under increased fluid pressure to allow drive fluid escape, shifting back onto the valve seat with increased coolant temperature, and shifted back off the valve seat at high fluid pressures which could be marginally excessive, even if high coolant temperatures exist.

The invention is particularly useful for trucks with air conditioning, as will be understood.

DESCRIPTION OF THE PREFERRED EMBODIMENT

Figure 1:
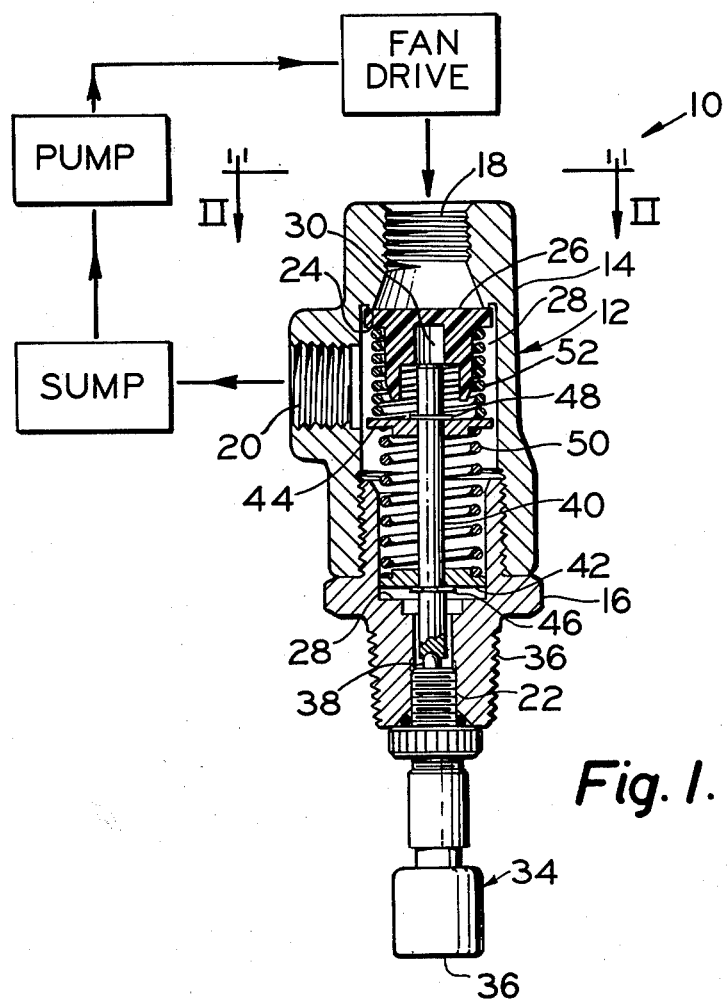
FIG. 1 is a sectional elevational view of the valve of this invention, with a fan drive, a sump and a pump all of which are shown schematically.
Figure 2:
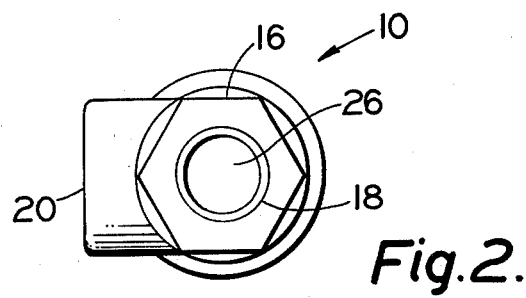
FIG. 2 is an end elevational view of the valve in FIG. 1 taken from the direction II—II in FIG. 1.

Referring now specifically to the drawings, the valve 10 depicted is shown as a part of a system including a sump, a pump and a fan drive. The valve has a housing 12 composed of a main body portion 14 and a threadably connected plug portion 16. The housing has an elongated passage 28 therethrough from one end to the other. At one end is a fluid inlet port 18 preferably having threads for connection of a fluid line thereto from the fan drive. Extending laterally out the side of the housing is a threaded fluid outlet 20 to the sump. On the opposite end of the housing and passage from inlet 18 is a threaded opening 22 to receive a thermoresponsive element. Positioned in passage 28 adjacent the end containing port 18 is an annular valve seat 24 which cooperates with the axial face of a valve spool 26 positioned to engage the seat or be moved in spaced relationship therefrom. Spool 26 therefore is capable of closing the main fluid flow passage between inlet 18 and outlet 20 when resting on seat 24, controllably stopping the flow or allowing full flow.

Threadably mounted at opening 22 is a conventional thermoresponsive element 34 typically having a fluid or semi-fluid contained in sensor bulb 36. Bulb 36 projects into the coolant jacket of a vehicle engine when housing 12 is connected to the engine block by exterior threads 36 in a port in the block. Projecting from the thermoresponsive, i.e. thermoexpansion element is its axial push rod 38 which shifts axially, protruding more into the housing 12 when bulb 36 reacts by expansion to increasing temperatures, and protruding less with contraction thereof into the thermoresponsive element when the latter reacts by contraction to lower temperatures. Push rod 38 engages one end of an elongated central plunger 40 extending between the thermoresponsive element push rod to spool 26. Positioned on plunger 40 is a pair of spring retainer plates, namely a spring retainer plate 42 adjacent the end of the housing containing the thermoresponsive element, and a spring retainer plate 44 intermediate the ends of plunger 40, toward the end of the housing containing spool 26 relative to plate 42. Straddling the spaced pair of retainer plates and affixed to the plunger is a pair of E-rings 46 and 48, respectively, for plates 42 and 44, preventing the plates from axially moving more than a predetermined amount therebetween, but allowing the plates to controllably be moved axially toward each other under certain conditions to be described hereinafter. Between plates 42 and 44 is a primary biasing compression coil spring 50 normally retaining these plates against the fixed E-rings 46 and 48. Retained between plate 44 and a peripheral flange on spool 26 is a secondary biasing compression coil spring 52 having less compressive force than primary spring 50. The end of plunger 40 adjacent spool 26 is cooperative with a recess 30 in the spool such that projection of the plunger end into this recess provides an over travel feature.

In the embodiment depicted, this novel control valve is in combination with a conventional fan drive which is either oil (i.e. fluid) driven or in which oil pressure overcomes the spring operated clutch of a fan assembly. In either type, the more fan drive fluid that is retained in the fan drive and not allowed to escape, the greater the drive capacity thereof and therefore the higher the speed of the fan for cooling action. Conversely, the more fluid that is allowed to escape from the fan drive, the lower the speed of the fan.

In operation, in the event the engine (not depicted) is operating under idling conditions with oil pressure less than about 5 or 6 psi and the engine coolant is relatively cold, the thermoresponsive element is retracted such that plunger 40 will be biased away from spool 26. The spool will be biased into engagement with seat 24 under the bias of both springs 50 and 52 with retainer plate 42 abutting annular shoulder 28' toward the end of passage 28 opposite the valve seat 24. Under these conditions, no fluid is released from the fan drive through the valve via inlet 18 to outlet 20. Thus, the fan is driven at approximately 80% of engine idle speed for low speed operation as to cool the air conditioning radiator on the truck. Thus, the unit assures against overheating of the air conditioning condensor. When the engine is operated at greater speeds, as the truck speed increases, such that the pump output to the fan drive is increased, the fluid flow and pressure to the fan drive will increase. Above a predetermined minimum pressure, e.g. around six psig, secondary spring 52 will be overcome by the oil pressure against the face of the spool, to shift the spool off valve seat 24 and allow full flow of the drive fluid to escape from the fan drive so that the fan speed will be maintained at idle. This is desirable since under these conditions, air flow through the radiator of the traveling truck is normally adequate for engine cooling. The maximum shift of the valve under these pressure conditions is with the heel of spool 26 against plate 44. As the vehicle continues and the engine driven pump causes the fluid pressure to be greater than the preset minimum for opening the valve, e.g. above about six psig, (but below a certain preset maximum, e.g. about twenty-five psig on a typical engine,) if the engine coolant temperature increases above an optimum predetermined temperature, e.g. above about 195 degrees Fahrenheit, expansion of fluid in sensor 36 will cause thermoresponsive push rod 38 to extend and shift plunger 40 toward the spool, overcoming spring 52 to shift spool 26 into its valve seat 24 such that all flow of oil through the unit is ceased. Under these conditions, with no fluid escape from the fan drive, the fan drive operates at full fan speed to maximize cooling of the engine.

In the event that the engine temperature remains relatively high, calling for maximum fan speed for cooling, but the pressure of the fluid to the fan drive increases at high engine speeds to marginally excessive values, e.g. above about twenty-five psig, the greater pressure at inlet 18 again causes spool 26 to be shifted away from valve seat 24 a controlled amount. This will occur by compression of primary spring 50 since at this time the secondary spring 52 will be fully compressed already, with heel of spool 26 being in abutment with plate 44. This shifting of the spool allows limited fluid escape to prevent excessive pressures in the pump and fan drive which could cause fracture of the equipment, or other fluid leaks. However, even with this controlled fluid release to prevent excessive pressures, the fan will still operate at full speed because of the pressure maintained by the pump.

Therefore, the unit optimizes fan operation, being functional during engine idling, being responsive to engine coolant temperatures, and also being responsive to fan drive fluid pressures, all with a relatively simple and reliable mechanism.

The embodiments of the invention in which an exclusive property or privilege is claimed are defined as follows.

1. A temperature and pressure responsive fluid flow control valve comprising:

a valve body having a passage with first connecting means at one end for attachment to a thermoexpansion element and an entry port at the second opposite end for entry of pressurized fluid, an exit port from said passage intermediate said ends, separated from said entry port by a valve seat; a valve element in said passage, shiftable between a first entry-port-closing position in engagement with said valve seat and a second entry-port-opening position spaced from said valve seat; primary and secondary biasing means for biasing said valve toward said entry-port-closing position, and said secondary biasing means being responsive to a first predetermined low fluid pressure force on said valve element to allow said valve element to shift from said first position to said second position to open said entry port; push rod means extending from said first valve body end for engagement with a thermoexpansion element, to said primary and secondary biasing means for shifting said biasing means toward said valve seat to thereby increase valve closing force on said valve element with increasing temperature, such valve closing force being counter to said fluid pressure at said entry port; and said primary biasing means being responsive to a second predetermined elevated fluid pressure at said entry port to allow said valve element to again shift to said second position for controlled pressure release at said entry port.

2. A temperature and pressure responsive fluid flow control valve for use with the fan drive of an engine having a circulating coolant comprising:

a valve body having a passage with a thermoexpansion element at one end thereof and a fluid entry port at the second opposite end thereof for entry of escaping pressurized fluid from the fan drive, an exit port from said passage intermediate said ends, separated from said entry port by a valve seat, for discharge of fan drive fluid; a valve element in said passage, shiftable between a first entry-port-closing position in engagement with said valve seat to prevent fluid escapement from the fan drive and a second entry-port-opening position spaced from said valve seat to allow fluid escapement from the fan drive; primary and secondary biasing means for biasing said valve toward said entry-port-closing position, and said secondary biasing means being responsive to a first predetermined low fluid pressure force on said valve element by the fan drive fluid to allow said valve element to shift from said first position to said second position to open said entry port for release of fan drive fluid; shiftable push rod means extending from said first valve body end for engagement with a thermoexpansion element, to said primary and secondary biasing means, for shifting said biasing means toward said valve seat with expansion of said thermoexpansion element to thereby increase valve closing force on said valve element with increasing temperature, such valve closing force being counter to the fluid pressure at said entry port; and said primary biasing means being responsive to a second predetermined elevated fluid pressure at said entry port to be compressed and allow said valve element to again shift to said second position for controlled pressure release at said entry port even with shifting of said push rod element toward said valve element under expansion of said thermoexpansion element.

* * * * *